(12) United States Patent
Buell et al.

(10) Patent No.: US 10,647,531 B2
(45) Date of Patent: May 12, 2020

(54) INDEPENDENTLY AUTOMATED LOADING SYSTEM FOR UNITIZED LOADS INTO A COVERED MULTI-LEVEL TRANSPORTER

(71) Applicant: Greenheart Farms, Inc., Arroyo Grande, CA (US)

(72) Inventors: Hoy Buell, Arroyo Grande, CA (US); John B Witmer, Arroyo Grande, CA (US)

(73) Assignee: Greenheart Farms, Inc., Arroyo Grande, CA (US)

( * ) Notice: Subject to any disclaimer, the term of this patent is extended or adjusted under 35 U.S.C. 154(b) by 147 days.

(21) Appl. No.: 15/803,540

(22) Filed: Nov. 3, 2017

(65) Prior Publication Data
US 2018/0134508 A1 May 17, 2018

Related U.S. Application Data

(60) Provisional application No. 62/419,274, filed on Nov. 8, 2016.

(51) Int. Cl.
*B65G 69/24* (2006.01)
*B65G 65/00* (2006.01)

(52) U.S. Cl.
CPC .......... *B65G 69/24* (2013.01); *B65G 65/005* (2013.01)

(58) Field of Classification Search
CPC ........ B65G 69/22; B65G 69/24; B65G 65/00; B65G 65/005; B65G 1/04; B65G 1/06; B65G 1/10; B65G 67/20; B01J 8/002; B01J 8/06; B01J 2208/00752; B01J 2208/0078; H01L 21/67769; H05K 13/021; B66F 9/195; B66F 9/19; B65D 88/54

USPC ............... 414/416.04, 659, 661, 287, 416.03
See application file for complete search history.

(56) References Cited

U.S. PATENT DOCUMENTS

| | | | |
|---|---|---|---|
| 4,203,696 A * | 5/1980 | Lindberg | A21B 3/07 414/277 |
| 4,492,504 A * | 1/1985 | Hainsworth | B66F 9/07 414/273 |
| 4,660,479 A | 4/1987 | Crisio, Jr. et al. | |
| 4,678,390 A * | 7/1987 | Bonneton | B65G 1/1375 294/4 |

(Continued)

FOREIGN PATENT DOCUMENTS

| | | | | |
|---|---|---|---|---|
| FR | 2987222 | 2/2012 | | |
| JP | 60087122 A * | 5/1985 | ............. | B65G 65/00 |

(Continued)

*Primary Examiner* — Glenn F Myers
(74) *Attorney, Agent, or Firm* — JRG Attorneys at Law

(57) ABSTRACT

An automated mechanical loading system for loading seedling carriers into a transporter bin for transport to the field for planting. The system of the present invention includes a transport bin having a plurality of rails mounted on the inside walls of the bin for accepting a plurality of carriers, power driven projections slidably mounted on sleds which are fixedly mounted to the top frame of a lift for urging one or more carriers into a preselected set of opposing rails in the bin. The lift controls the height of the sled so that the carriers are urged into the preselected set of rails in the bin. A mechanically referenced coupler is included for securing the lift to the bin to restrict movement of the lift relative to the bin into which the seedling carriers are to be loaded during the automated loading operation.

15 Claims, 17 Drawing Sheets

(56) References Cited

U.S. PATENT DOCUMENTS

| | | | |
|---|---|---|---|
| 4,756,657 A * | 7/1988 | Kinney | B65G 1/0435 |
| | | | 414/280 |
| 4,854,802 A | 8/1989 | deGroot | |
| 6,080,951 A | 6/2000 | Thijssen et al. | |
| 6,591,766 B2 | 7/2003 | Williames | |
| 7,316,189 B2 | 1/2008 | Fountain et al. | |
| 7,866,087 B2 | 1/2011 | Sluiter et al. | |
| 7,905,186 B2 | 3/2011 | Faulrin et al. | |
| 8,122,838 B2 | 2/2012 | Faulrin | |
| 9,661,800 B2 | 5/2017 | Buell et al. | |
| 2002/0085904 A1 * | 7/2002 | Hallstrom | B65G 25/065 |
| | | | 414/400 |
| 2006/0231670 A1 * | 10/2006 | Giddens | B60P 1/003 |
| | | | 242/538 |
| 2016/0236881 A1 * | 8/2016 | Ito | B65G 67/04 |

FOREIGN PATENT DOCUMENTS

| | | | | |
|---|---|---|---|---|
| JP | 11130268 A * | 5/1999 | | B65G 67/20 |
| JP | 2011178563 A * | 9/2011 | | B23Q 3/15526 |

* cited by examiner

FIG. 11C

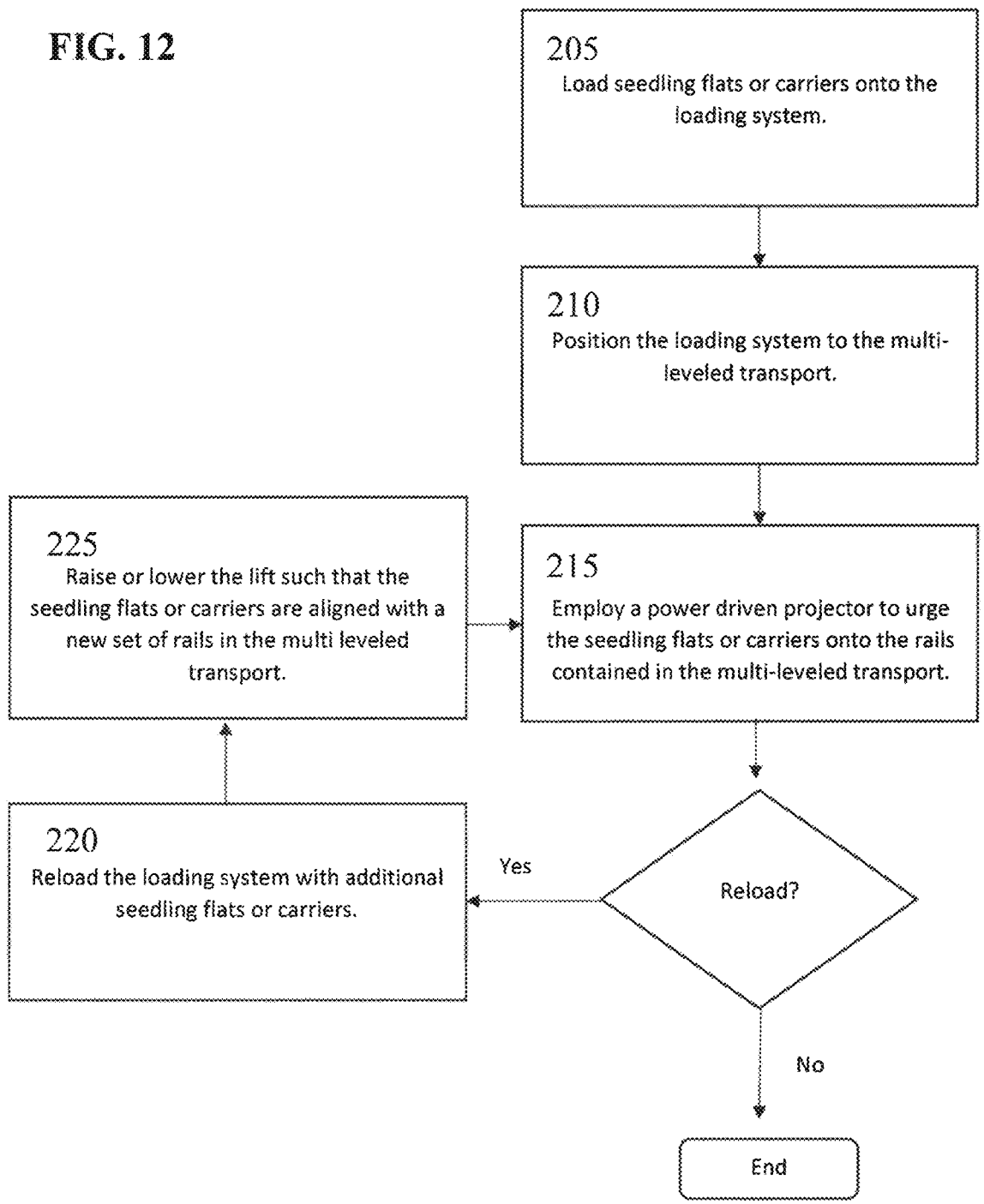

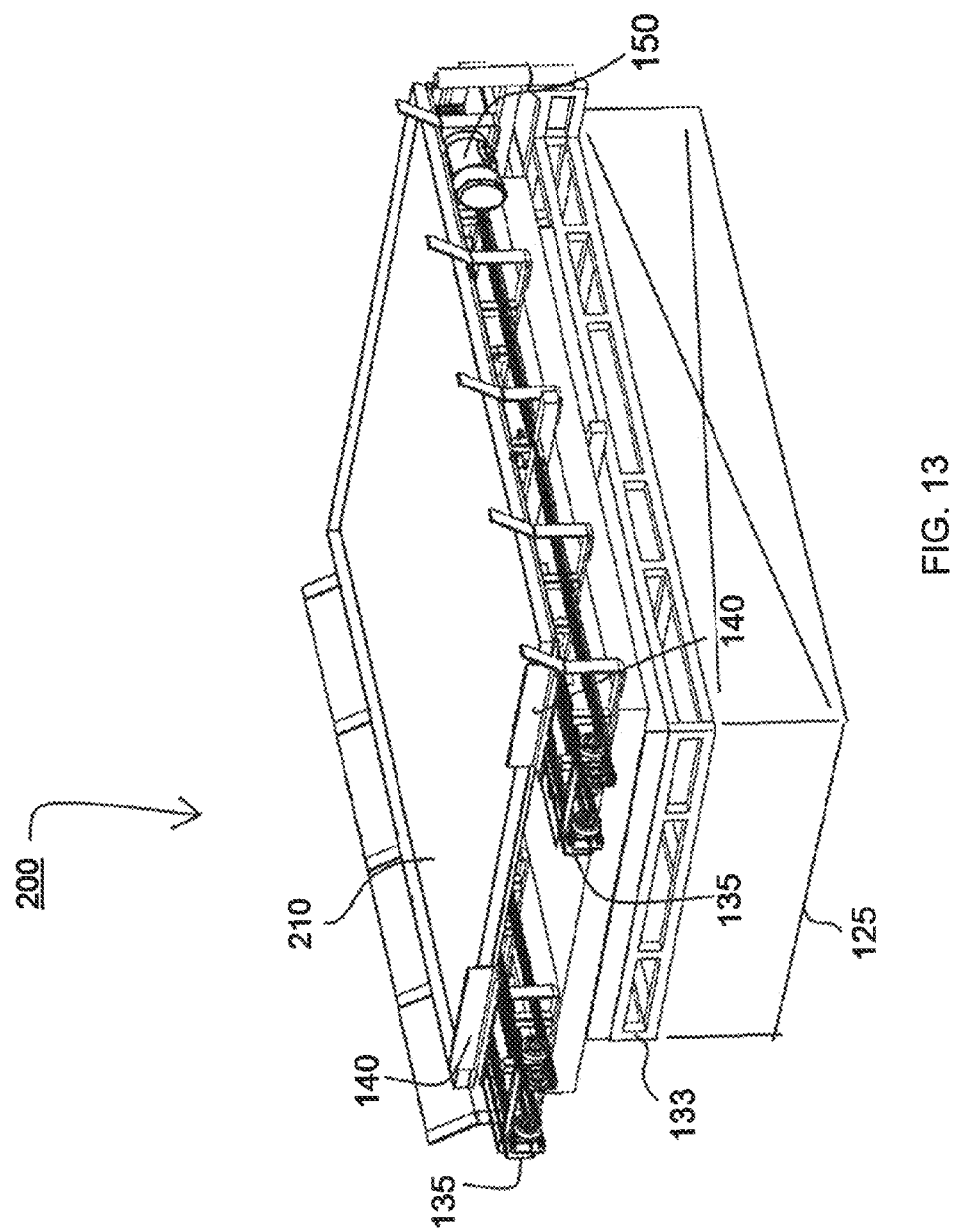

INDEPENDENTLY AUTOMATED LOADING SYSTEM FOR UNITIZED LOADS INTO A COVERED MULTI-LEVEL TRANSPORTER

CROSS-REFERENCE TO RELATED APPLICATIONS

This Application is entitled to the benefit of, and claims priority to U.S. Provisional Application 62/419,274, filed Nov. 8, 2016.

TECHNICAL FIELD

The present invention relates generally to a programmable mechanical system for loading unitized loads such as load carrying pallets, into a multi-level covered transporter. In particular, the present invention relates to a loading system for loading carriers of a plurality of seedling trays into such a multi-level covered transport.

BACKGROUND OF THE INVENTION

This invention is a system for loading plant seedlings into a covered transport in a commercial seedling growing operation. Typically, a plurality of seedling trays in such an operation are manually loaded onto carriers. Two or more such carriers are then manually loaded onto a forklift for moving to the loading end of a covered transport, hereinafter also, a bin. The bin has its ends, sides, top and bottom fully sealed for protection from wind and other weather elements during transport to fields for planting, of which one end incorporates doors for loading. Each such bin includes a plurality of rails mounted to the inside of two opposing sides for receiving the ends of the carrier which form a plurality of vertically stacked shelves with enough separation to accommodate the height of the seedlings and unloading in the fields. The rails are spaced to accommodate a variety of plant types, each of which may require different spacing between the shelves.

In some other instances, some loading operations choose to forgo the use of a carrier. Instead, seedling trays are loaded directly into the bins. In these cases, the bins are structured to include multiple columns of vertically stacked shelves, wherein the widths of each column are approximately the length of a seedling tray, instead of the length of a carrier which can hold multiple rows of seedling trays.

Currently, carriers of seedling trays are manually loaded into the bins for transport. Because they are fixedly covered on all sides, top and bottom, except for the loading access doors mounted on the back end, the workers, one on each end of the carrier, manually place each end of the carriers on the rails and simply push them into the bin. Since the bin is designed to receive more than one carrier per set of rails, the workers must push all such carriers into the final position in the bin. This process is repeated for all of the shelves, beginning from the bottom set of opposing rails.

The seedlings grow in a very small plug of dirt and are moist to continue growing until planted in the field. Since the seedling trays each contain as many as 450 seedlings and since there are at least 12 seedling trays per carrier, these carriers are very heavy, weighing approximately 60 pounds each.

Since the carriers are heavy, manual loading is very time consuming and impractical. Importantly, there is a substantial risk of injury to the workers performing the loading operation. The loading operation involves at least two workers, one at each end of the carrier, cooperatively moving sideways to move the carriers toward the loading end of the bin, then performing an awkward bending and twisting motion to insert the carriers on the selected set of opposing rails in the bin.

Accordingly, there exists a need for a mechanical loading system for loading carriers of seedlings into the bins. The system of the present invention mitigates the need for manual labor and thus reduces labor expenses. More importantly, the present invention eliminates risk of injury and related potential temporary or permanent disability of the workers and related medical expenses.

BRIEF SUMMARY OF THE INVENTION

One feature of the present invention provides an independently automated mechanical seedling loading system that reduces the need for manual labor.

Another feature of the present invention provides a loading system for loading seedling carriers into a multi-level transporter (bin) at a desired spacing to accommodate seedlings of various sizes.

An additional feature of the present invention provides for loading, a bin having more than one column for receiving at least one flat or tray of seedlings, each column comprising vertical supports dividing the width of the bin, and pairs of opposing rails spaced to hold the flats or tray of seedlings.

A further feature of the present invention provides an independently automated mechanical loading system that loads carriers loaded with trays of plug seedlings, or individual trays, into each multi-level bin, or column thereof, for delivery to the field for planting.

Another feature of the present invention provides a programmable mechanical loading system for transporting seedlings to the field for planting. It has a plurality of carriers containing a plurality of seedling trays for loading into a transporter bin having a plurality of rails mounted on the inside walls of the bin, a power driven projection on a pair of sleds mounted to the top frame of a scissor lift for urging one or more carriers into a preselected set of opposing rails inside the bin, the scissor lift used for adjusting the height of the carrier load so that they are urged into the preselected set of rails inside the bin, and a mechanically referenced bottom coupler to form a solid uni-frame for securing the scissor lift to the bin to restrict movement of the scissor lift relative to the bin into which the seedling carriers are to be loaded during the automated loading operation.

A feature of the present invention provides a height variable automated loader, capable of loading cargo into a variety of receivers.

A further feature of the present invention provides an independently automated mechanical loading system capable of loading seedling trays into a receiving unit having multiple columns for storing and transporting seedling trays.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

Figure 11C:
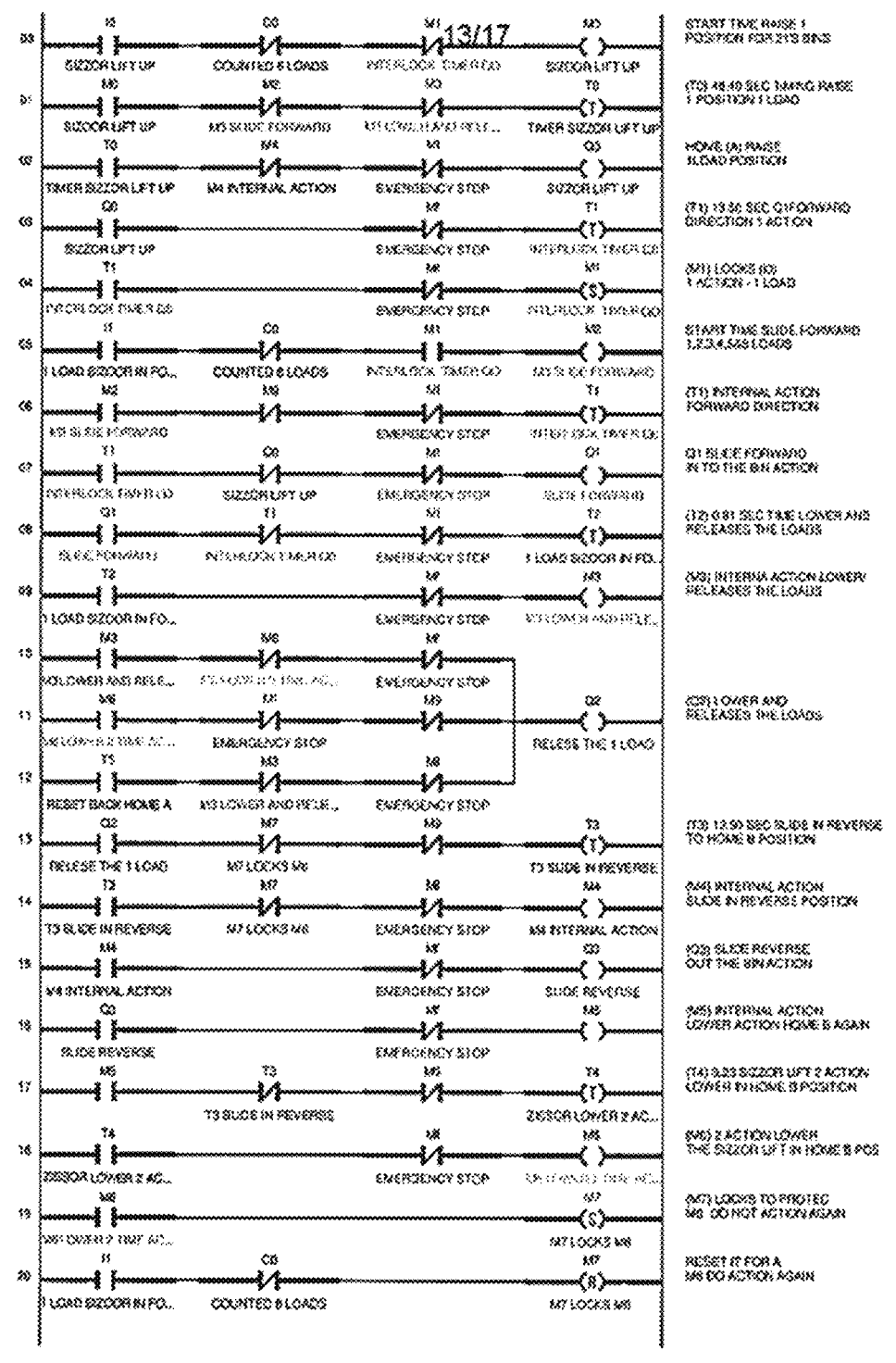

FIGS. 11A, 11B, 11C and 11D, illustrates the program instructions for the controller of the loading system of FIGS. 1 and 2

FIG. 12 is a flow chart directed to a method for practicing one embodiment of the present invention for loading seedling flats or carriers into a multi-level transporter system.

FIG. 13 is a perspective view of a possible automated mechanical loader for loading cargo into a variety of receivers.

FIG. 15 is a is a top view of the loading system illustrating a carrier sized such that the length of the carrier is less than the depth of the receiving unit and having a width less than the width of the receiving unit.

DETAILED DESCRIPTION OF THE INVENTION

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims. The term seedling carrier in this application should not be construed to limit the use of the claimed invention only for loading seedlings, but rather, the invention can be applied to any palletized load within the scope of the claims. Furthermore, the foregoing use of the words transporter bin should not be construed to limit the use of the invention to a particular type of storage or transport, but rather the invention is envisioned as being capable of operating on any type of storage or receiving unit.

The present invention is a system 100 for loading a plurality of seedlings trays loaded on carriers into multi-level transporting bins to the field for planting.

Figure 1:
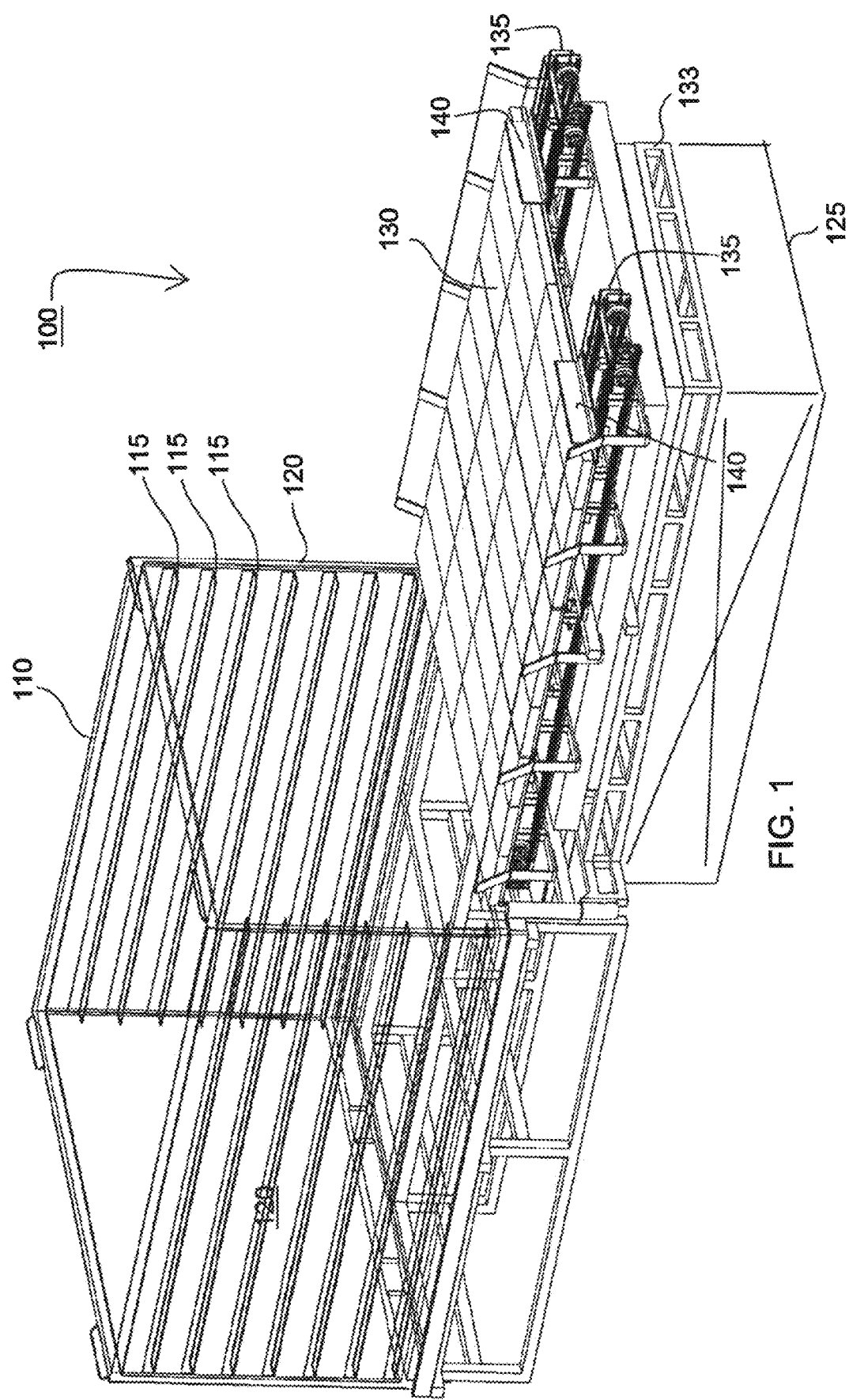
FIG. 1 is a perspective view of an automated mechanical loading system for transporting seedlings to the field for planting according to the present invention.

Referring now to FIG. 1, the present invention comprises a loading system 100 having transporter bin 110 with a plurality of pairs of rails 115 mounted to the inside of side walls 120, a plurality of carriers 130 containing a plurality of seedling trays for loading transporter bin 110. Carriers 130 are sized such that their width matches the spacing between the pairs of Rails 115, such that the carriers may rest upon the Rails 115. Carriers 130 may have a length equal to the depth of transporter bin 110 so that a single carrier 130 may rest upon each pair of opposing Rails 115. Alternatively, carriers 130 may have a length less than the depth of transporter bin 110 such that multiple carriers 130 rest upon a single pair of opposing rails 115. Rails 115 may be constructed of common angle iron, sized approximately for the size and weight of carrier 130. System 100 also includes power driven projections or blocks 140 slidably mounted on transfer sled 135, each of the sleds 135 being mounted on frame 133 of scissor lift 125. The power-driven projections 140 engage the outmost edge of the outmost carrier to urge one or more carriers into a preselected set of opposing rails in the bin. Scissor lift 125 is provided for adjusting the height of the carrier so that the carriers 130 are urged into a preselected pair of opposing rails 115 in the bin. System 100 also includes a mechanically referenced couple for securing scissor lift 125 to bin 110 to restrict movement of the scissor lift 125 relative to bin 110 which seedling carriers 130 are loaded into during the automated loading operation.

Figure 2:
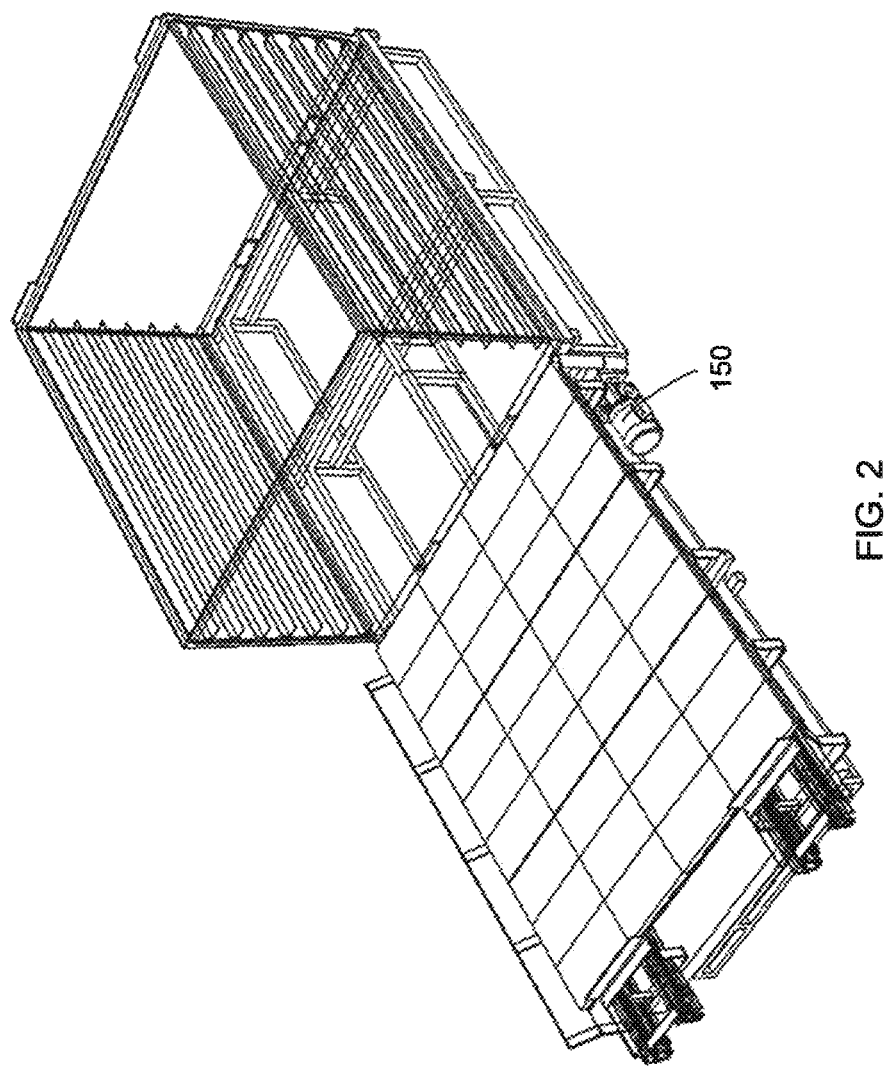
FIG. 2 is also a perspective view of the system of FIG. 1 showing details of the driver.

Referring now to FIG. 2, drive motor and related programmable control system controller 150 is shown. Controller 150 may comprise a processor and non-transitory computer readable medium or memory. Controller 150 is provided program instructions, such as those listed in FIGS. 11A, 11B, 11C and 11D, stored on the non-transitory computer readable medium and executed by the processor. Controller 150 may be electronically coupled to scissor lift 125 and power-driven projections or blocks 130. According to the program instructions, controller 150 may automatically engage scissor lift 125 and power-driven projections or blocks 130 to usher in carriers 130 into the rails 115 of bin 110. Controller 150 may include an access port or console so that a user may make changes to the program instructions to adjust for specific situations. Access port may comprise a computer bus or communication port. The computer bus may accept communications from an external computer system or an external memory device. An external memory device may store alternative programs to be side loaded to the controller or to overwrite any default programming for specific circumstances. An external computer system may also be similarly used to make adjustments to the programmed sequence. Additionally, controller 150 may include a console. The console may comprise a display and user interface devices such as a keyboard keypad and a mouse or trackpad. A user may access the console to make adjustments to the program instructions for specific situations.

According to an embodiment, the non-transitory computer-readable medium or memory of controller 150 houses a default program. Pursuant to the default program, rails 115 are denoted as having a predetermined spacing, and controller 150 will engage scissor lift 125 to lift carriers 130 to the predetermined height of each pair of rails 115 and then will engage power-driven projections 140 to usher carriers 130 into the rails. In an example embodiment, a user may want to apply system 100 with plant seedlings that require more space than provided between the pairs of rails. The user may then insert an external memory device, containing an alternate program, into the computer bus of controller 150. Pursuant to the alternate program, controller 150 will engage scissor lift 125 to lift carriers to every other pair of rails 115, and will engage power-driven projections 140 to usher carriers 130 into the alternating rails.

In an additional embodiment, a user may apply system 100 to a bin 110 having rails 115 set at heights differing to those designated in the default program. A user may then access a console on controller 115 to adjust the software accounting for the difference in the rail height.

Figure 3:
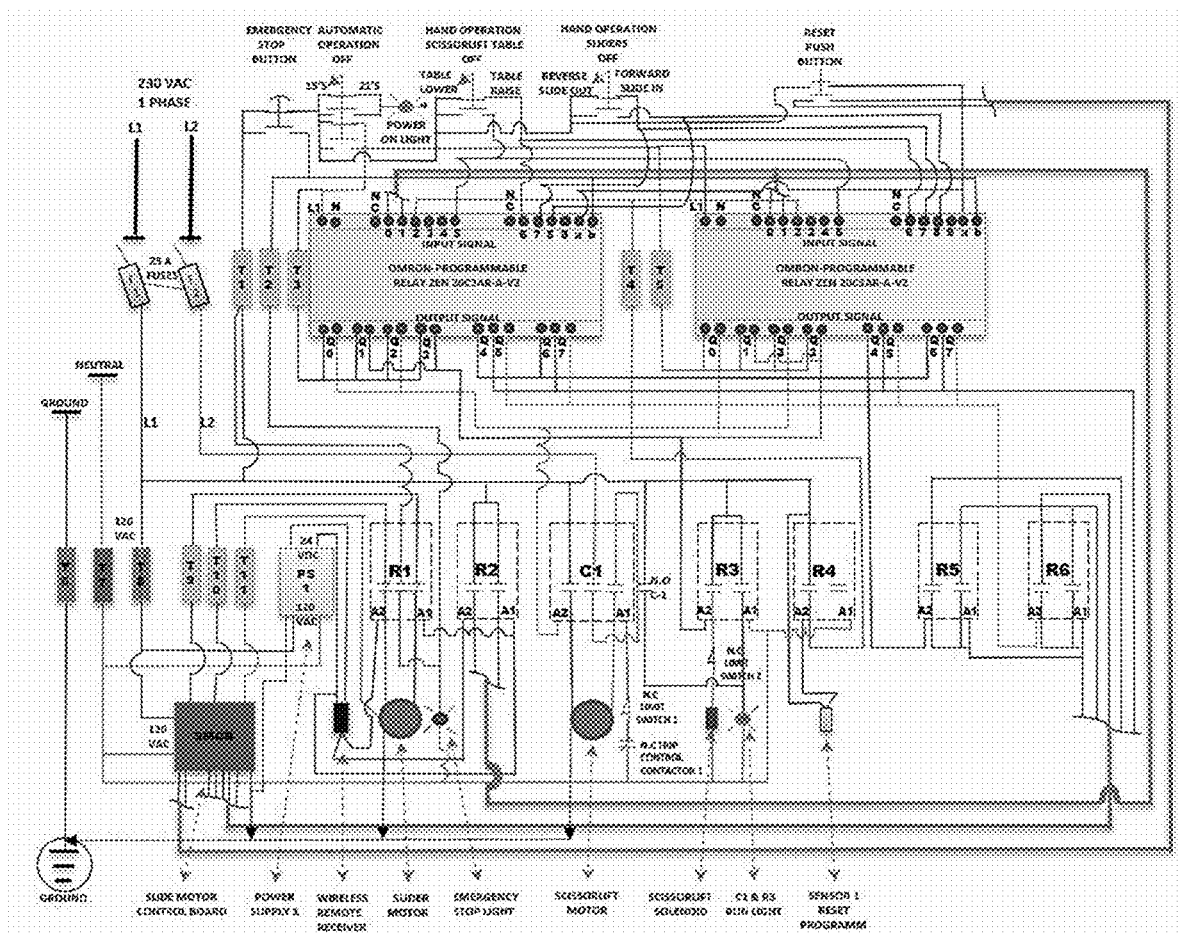
FIG. 3 is an example wiring schematic for the controller unit.

FIG. 3 depicts an example of a wiring schematic for the controller unit. As depicted in FIG. 3, the various components of the automated bin loader are electronically coupled to programmable chips. In FIG. 3, the schematic depicts the controller unit being run by an OMRON® Programmable relay. However, any equivalent board may be used.

In an embodiment, the bin loading system may advantageously include the following parts: AUTOQUIP 48S25 Series 35 Scissor Lift Table, EAGLE Slide Gate Operator 2000 FC, HONDA Power Generator EM 4000SX, OMRON ZEN-20C3AR-A-V2 Programmable Relay, SCHNEIDER ELECTRIC LC1D25 IEC Magnetic Contractor, SCHNEIDER ELECTRIC LRD32 Overload Relay Trip Class: 10, SOLA HEVI-DUTY SDP1-24-100T DC power supply, FERRAZ SHAWMUT USM2I Finger Safe fuse block, DAYTON LR40787 Plug-in relay, SCHNEIDER ELECTRIC RXM2AB2BD Plug-in Relay, DAYTON 1EHK1 Plug-in relay, DAYTON 1EHK5 Plug-in relay, 24V Wireless Remote Control Kit, SCHNEIDER ELECTRIC 9001KR9R05H13 Non-illuminated push button, SCHNEIDER ELECTRIC 9001SKS53BH1 Non-illuminated selector switch, SCHNEIDER ELECTRIC 9001KS46B Non-illuminated selector switch operator, SCHNEIDER ELECTRIC ZB4BA3 Metal push button operator, WIEGMANN N412161608C carbon steel enclosure, EDWARDS SIGNALING 113SP-RGA-N5 Machlight machine status indicator, and HUBBEL HBL26W74 watertight locking plug.

Figure 4:
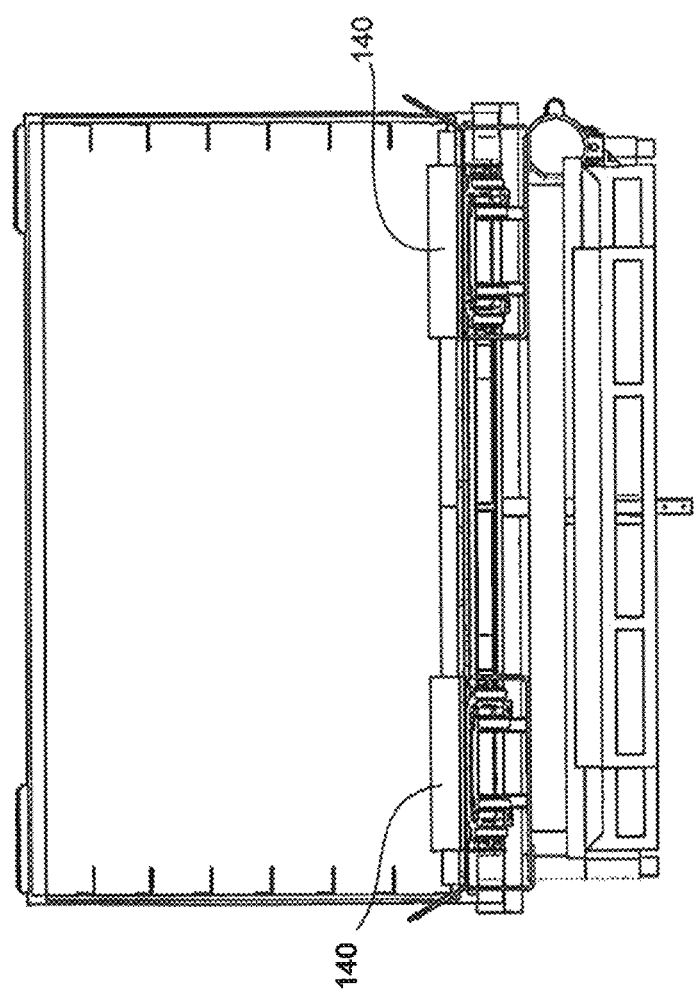
FIG. 4 is an end view of the loading end of the loading system of FIG. 1.
Figure 5:
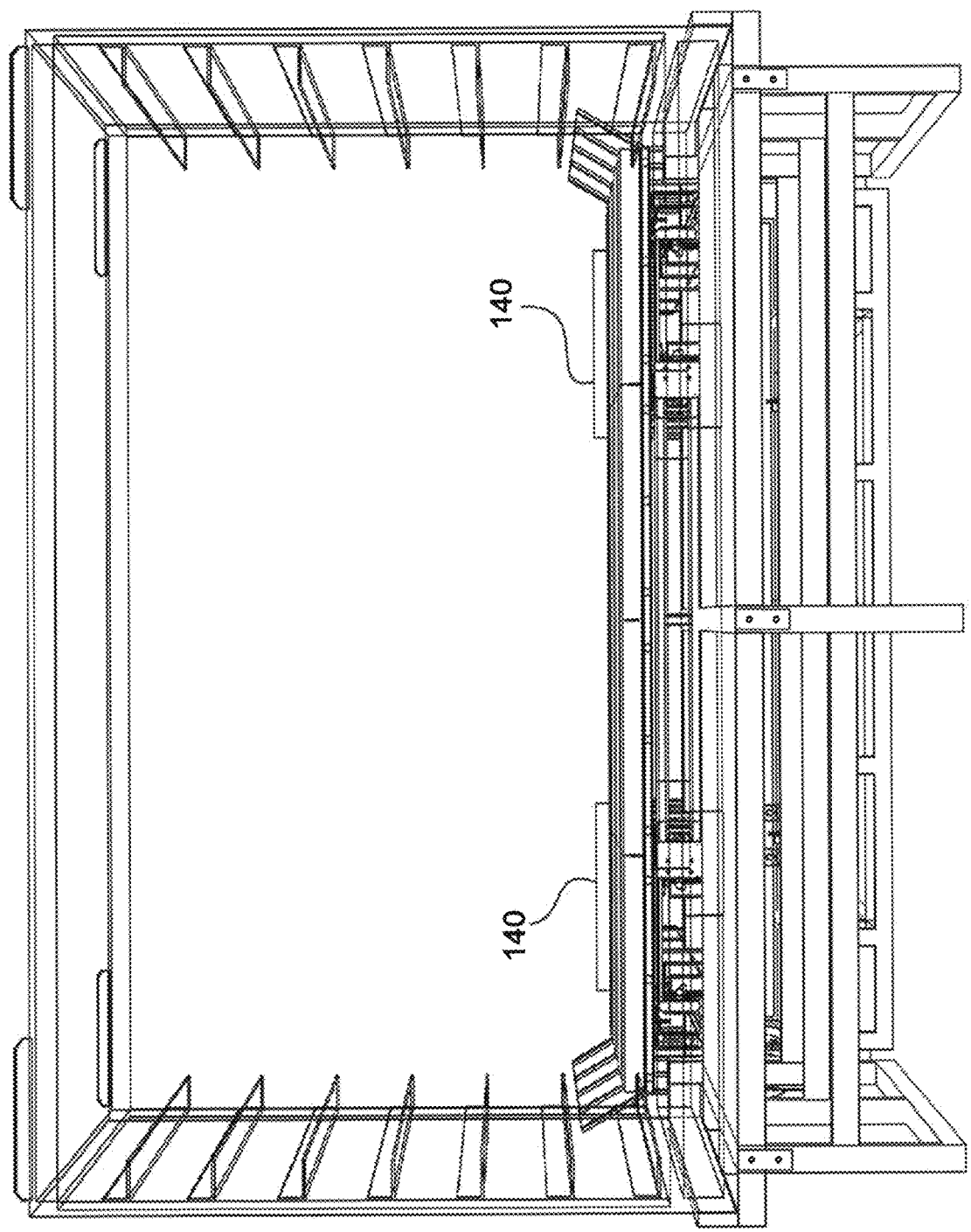
FIG. 5 is an end view of the aft end of the loading system of FIG. 1.
Figure 6:
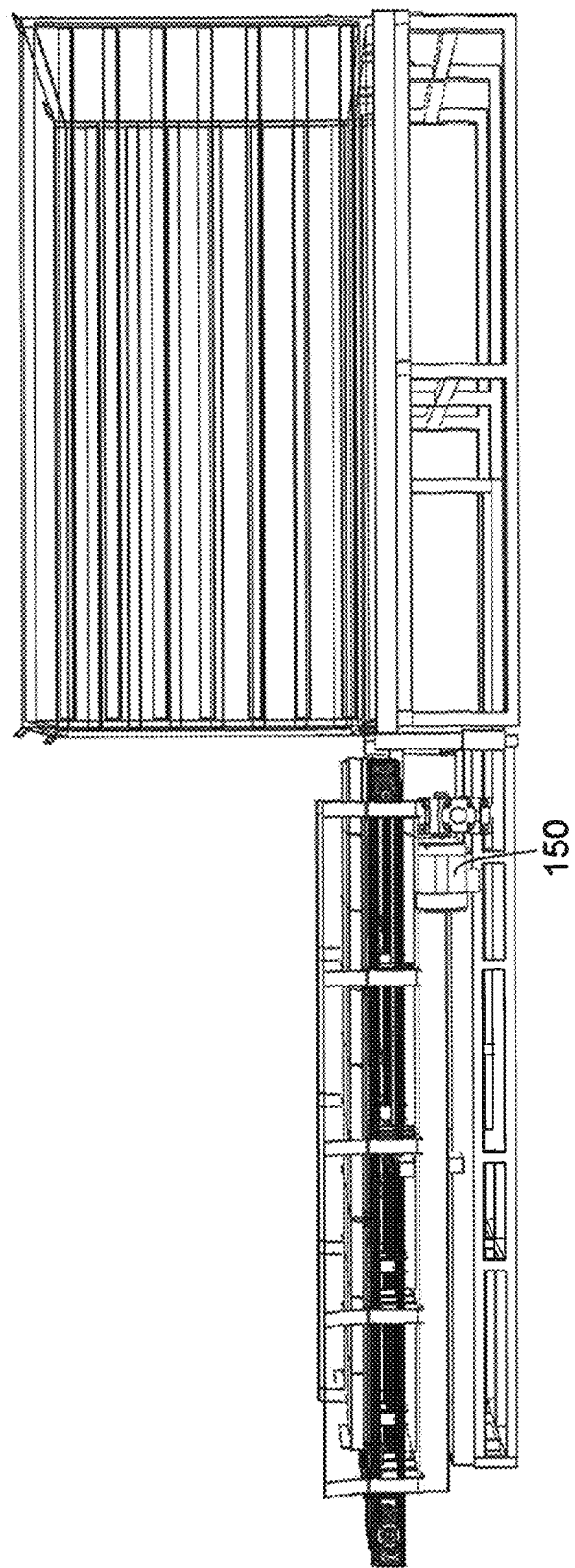
FIG. 6 is one side view of the loading system of FIG. 2.
Figure 7:
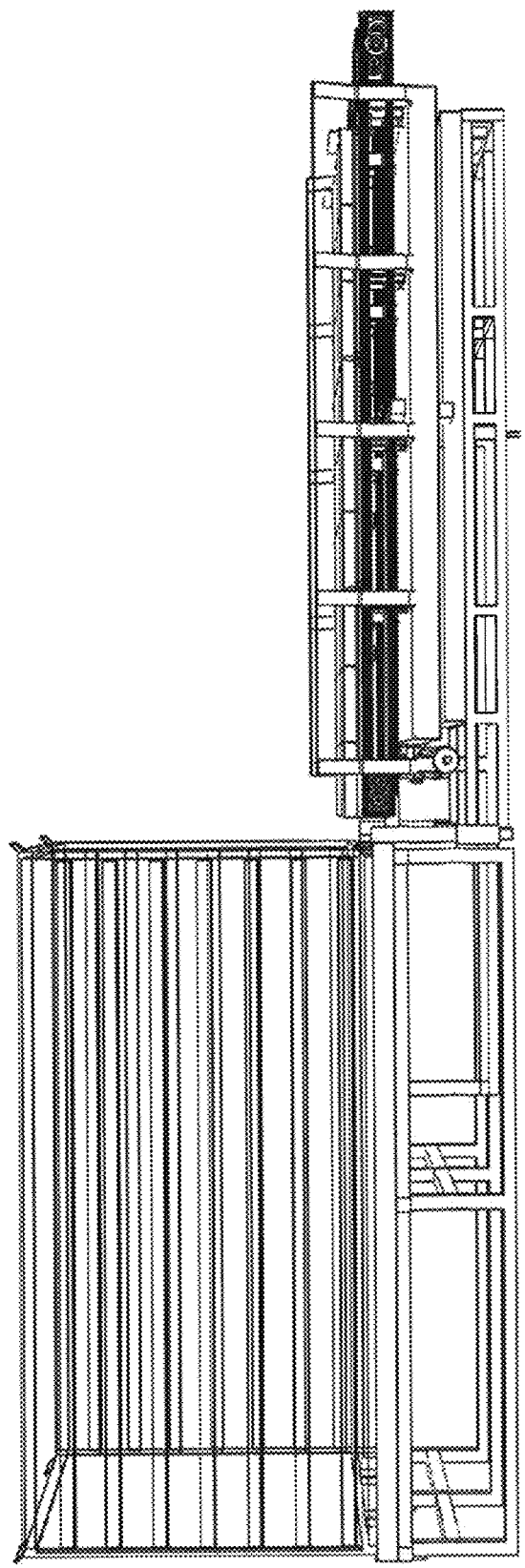
FIG. 7 is the other side view of the loading system of FIG. 1.
Figure 8:
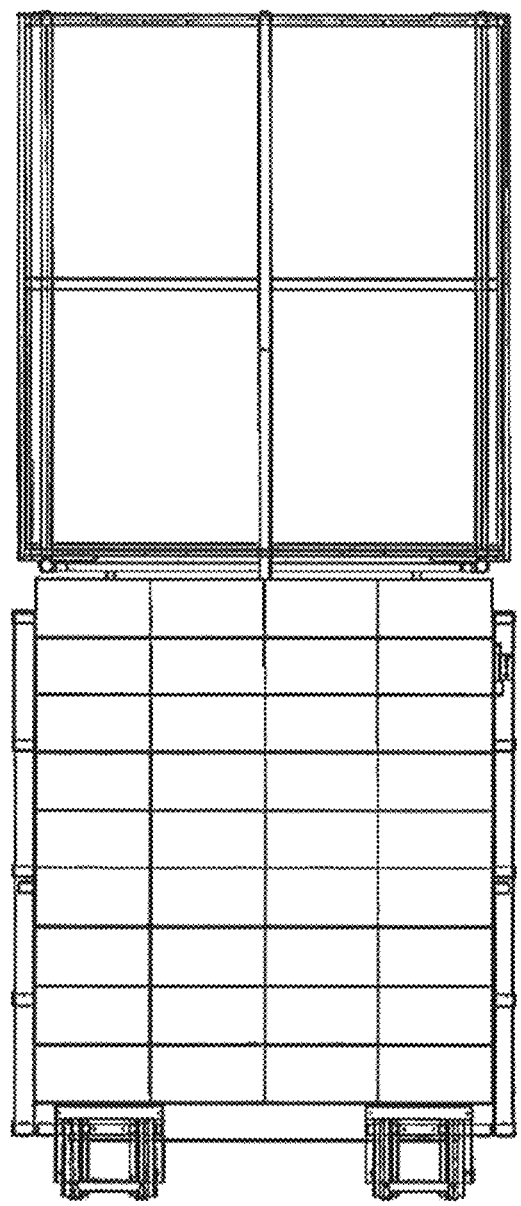
FIG. 8 is a top view of the loading system FIGS. 1 and 2.
Figure 9:
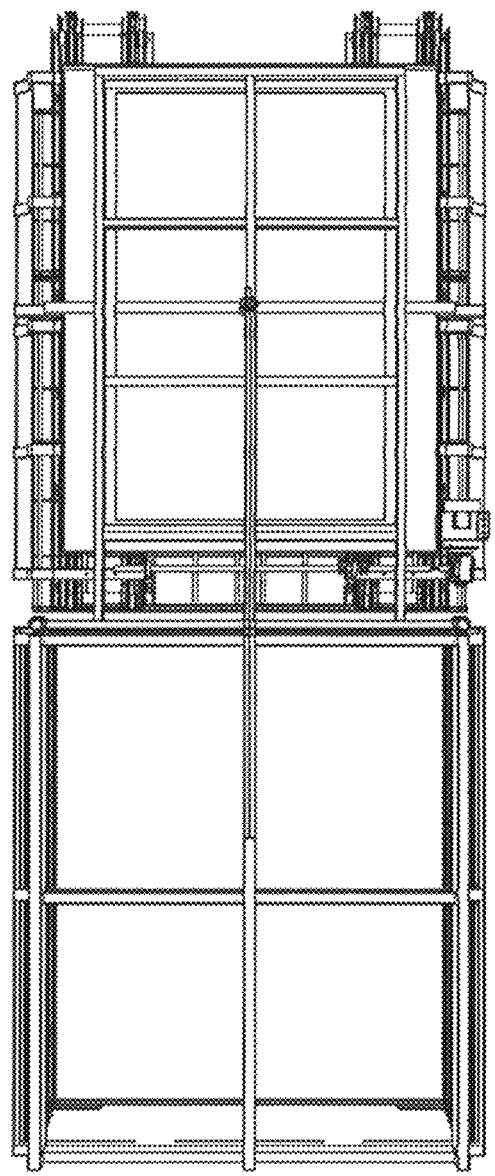
FIG. 9 is a bottom view of the loading system of FIGS. 1 and 2.
Figure 10:
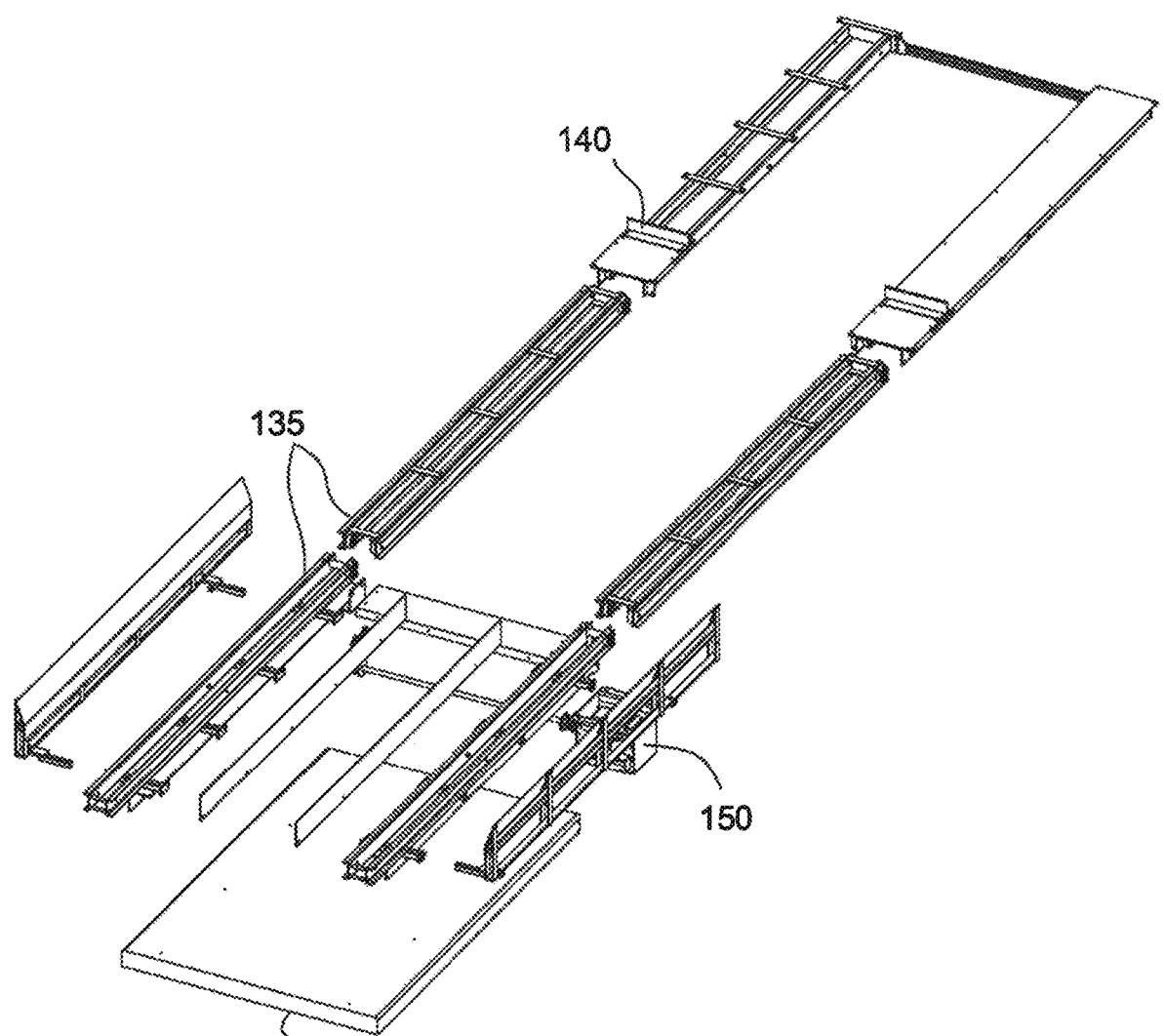
FIG. 10 is an exploded view of the loading system of FIGS. 1 and 2.
Figure 11A:
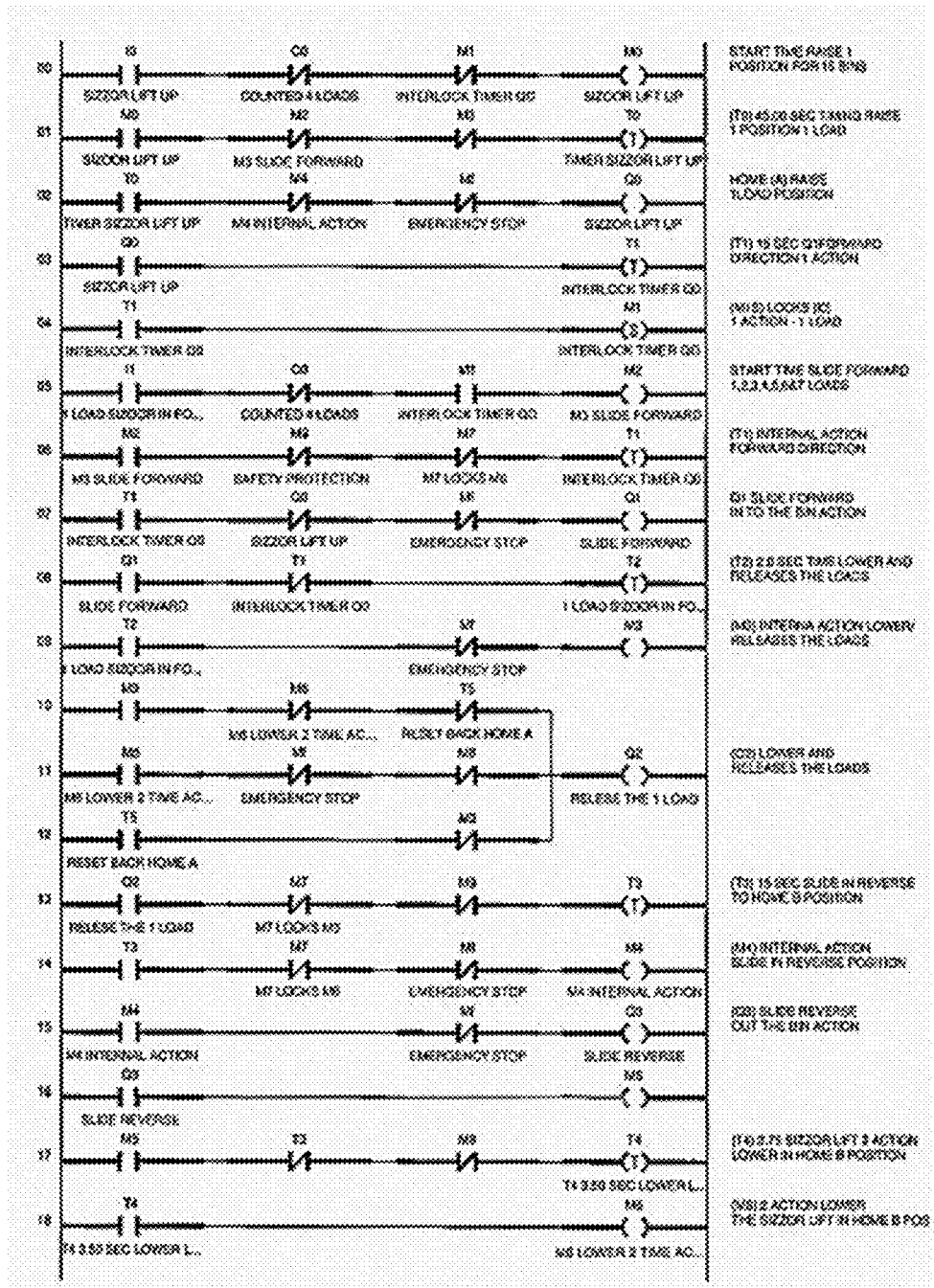
Figure 11B:
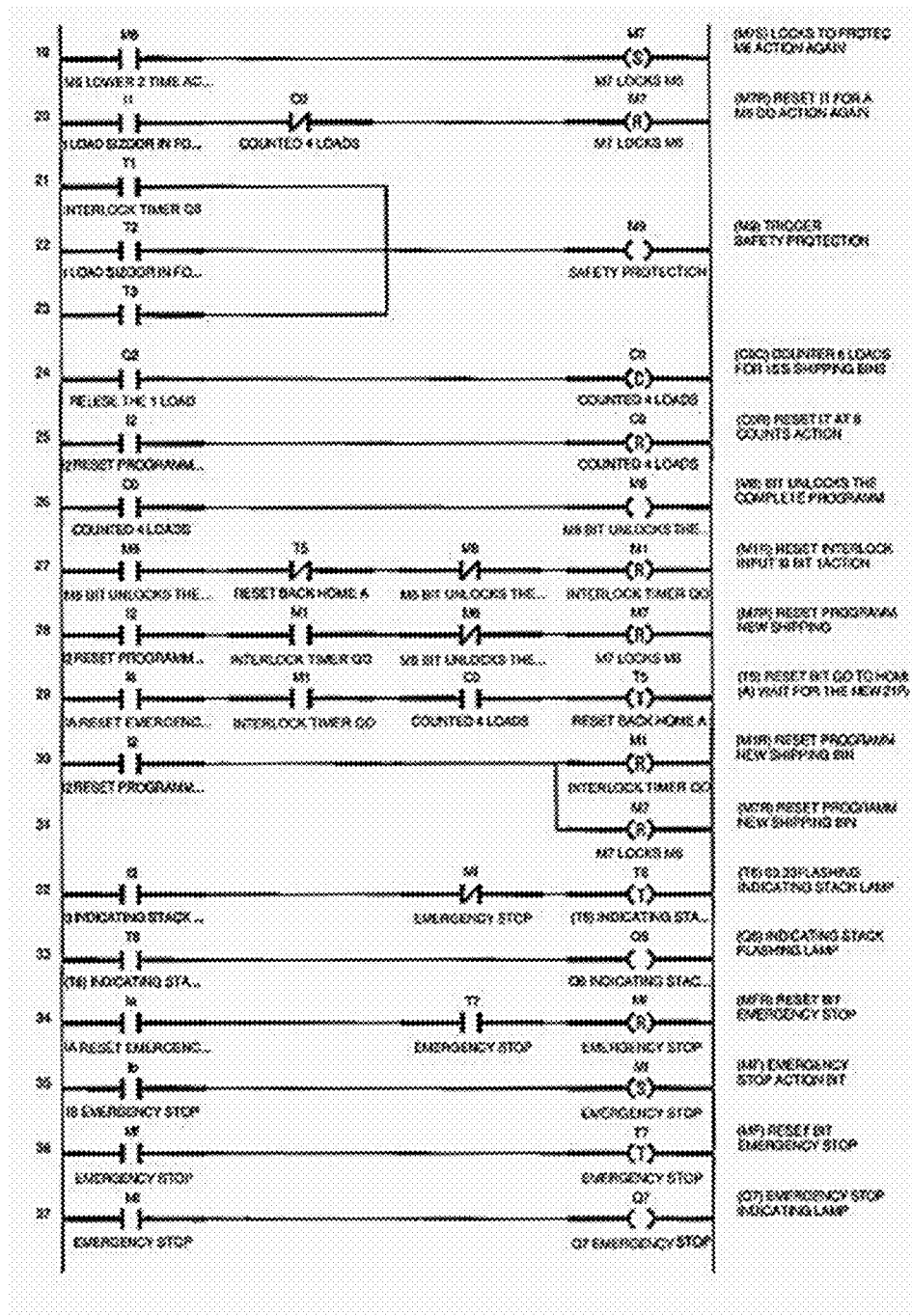
Figure 11D:
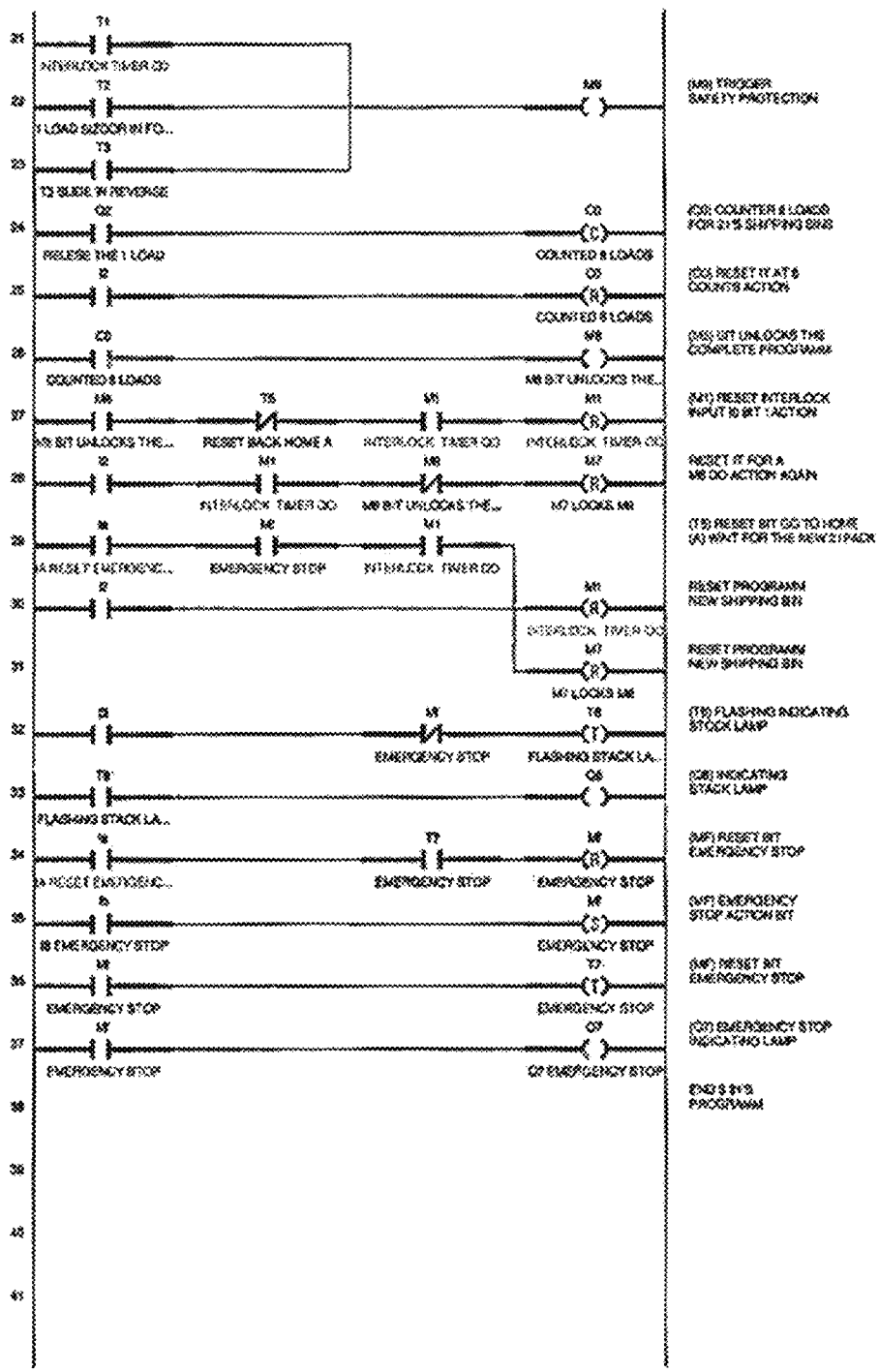

FIG. 4 shows loading system 100 from the loading end. Doors (not shown) close over the loading end after the seedling carriers are loaded for full protection of the seedlings during transport to the field for planting. Note that projections may be constructed of the same common angle iron stock used to construct rails 115.

FIGS. 5, 6, 7, 8, and 9 are side, top, bottom, and exploded views, respectively of system 100.

FIGS. 11A, 11B, 11C and 11D illustrates the program instructions for programming the controller of drive system 150. Table 1 provides comments to the program instructions of FIGS. 11A, 11B, 11C and 11D.

| I0 | Comment: SIZZOR LIFT UP |
|---|---|
| I1 | Comment: 1 LEAD SIZOOR IN FORWARD |
| I2 | Comment: I2 RESET PROGRAMM NEW BIN |
| I3 | Comment: I3 INDICATING STACK FLASH LAMP |
| Ia | Comment: IA RESET EMERGENCY STOP |
| Ib | Comment: IB EMERGENCY STOP |
| Q0 | Comment: SIZZOR LIFT UP |
| Q1 | Comment: SLIDE FORWARD |
| Q2 | Comment: RELESE THE 1 LOAD |
| Q3 | Comment: SLIDE REVERSE |
| Q6 | Comment: I2 RESET PROGRAMM NEW BIN |
| Q7 | Comment: Q7 EMERGENCY STOP |
| M0 | Comment: SIZZOR LIFT UP |
| M1 | Comment: INTERLOCK TIMER QO |
| M2 | Comment: M3 SLIDE FORWARD |
| M3 | Comment: |
| M4 | Comment: M4 INTERNAL ACTION |

TABLE 1

| Drawing Name | AUTO LOAD SHIPPING 15's BINS SYSTEM-1 | | | Silestre | Rung Start |
|---|---|---|---|---|---|
| Figure No | 15's SHIPPING BINS | Revision Mark | Prepared by A | Amaro Date | Step 11/2514 |
| M5 | Comment: | | | | |
| M6 | Comment: M6 LOWER 2 TIME ACTION | | | | |
| M7 | Comment: M7 LOCKS M6 | | | | |
| M8 | Comment: M8 BITS UNLOCKS THE PROGRAM | | | | |
| M9 | Comment: SAFETY PROTECTION | | | | |
| Mf | Comment: EMERGENCY STOP | | | | |
| T0 | Set Value: Off-delay Timer45Second000Millisecond Comment: TIMER SIZZOR LIFT UP | | | | |
| T1 | Set Value: Off-delay Timer15Second000Millisecond | | | | |

TABLE 1-continued

| Drawing Name | AUTO LOAD SHIPPING 15's BINS SYSTEM-1 | | | Silestre | Rung Start |
|---|---|---|---|---|---|
| Figure No | 15's SHIPPING BINS | Revision Mark | Prepared by A | Amaro Date | Step 11/2514 |
| | Comment: INTERLOCK TIMER Q0 | | | | |
| T2 | Set Value: Off-delay Timer02Second000Millisecond Comment: 1 LOAD SIZZOR IN FORWARD | | | | |
| T3 | Set Value: Off-delay Timer15Second000Millisecond Comment: | | | | |
| T4 | Set Value: Off-delay Timer03Second750Millisecond Comment: | | | | |
| T5 | Set Value: Off-delay Timer45Second000Millisecond Comment: T4 3.50 SEC LOWER LOADS | | | | |
| T6 | Set Value: Off-delay Timer05Second000Millisecond Comment: RESET BACK HOME | | | | |
| T7 | Set Value: Off-delay Timer00Second300Millisecond Comment: (T6) INDICATING STACK FLASHING | | | | |
| C0 | Set Value: Counter Set Value: 0008 Comment: COUNTED 4 LOADS | | | | |

In an alternate embodiment, the loading bin 110 comprises at least two vertical columns 160. Each vertical column is comprised of two vertical supports 165 defining the side bounds of the column. Vertical support 165 may act as supports for two adjacent columns. Side walls 120 may also serve as a vertical support 165 for the outermost columns. At least one pairs of opposing rails 115 abut the interiors of the vertical supports 165 in each column. In this embodiment, system 100 engages with bin 110 by means of a mechanically referenced coupler for securing scissor lift 125 to bin 110 to restrict movement of the scissor lift 125 relative to bin 110. Scissor lift 125 may then engage to raise loaded seedling trays level with rails 115. Optimally, in this embodiment, the widths of each column are approximately equal to the length of the seedling trays, such that the seedling trays fit between the vertical columns 165 and rest upon the opposing rails 115 of the vertical columns 165. Alternatively, carriers which have had their dimensions adjusted may also be used. In this embodiment, carriers that have been sized to sit upon opposing rails 115 in each vertical column 165 may be loaded with seedling trays. Power driven projections or blocks 140 then engage to push the seedling trays or carriers into bin 110. System 100 may be designed to engage each column 160 of the bin 110 simultaneously. Alternatively, power driven projections or blocks 140 may be individually engaged such that system 100 may engage carriers into single vertical columns 165 at a time. System 100 may also be designed with a single power-driven projection or block 140 which engages each column 160 of the bin 110 sequentially.

FIG. 13 shows an independently automated loading apparatus 200 for unitized loading comprises a loading platform 210 structured to hold cargo, a lift 125, and power-driven projection blocks 140. According to this embodiment, a loading apparatus may be utilized to load cargo in a variety of receiving units. For example, loading apparatus 200 may be engaged to load cargo onto a shipping container or flatbed truck. According to this embodiment, platform 210 is loaded with the desired cargo. Cargo may include seedling trays, sprouts, or even matured plants. Because loading apparatus 200 is not restricted to loading into shelved bins, platform 210 may hold a larger variety of cargo, including items with heights exceeding the height of the rails in a covered bin. Lift 125 engages to lift the carrier to the desired height, and power-driven projections 140 engages the platform 210 to urge the carriers into a preselected set of opposing rails in the bin.

Figure 14:
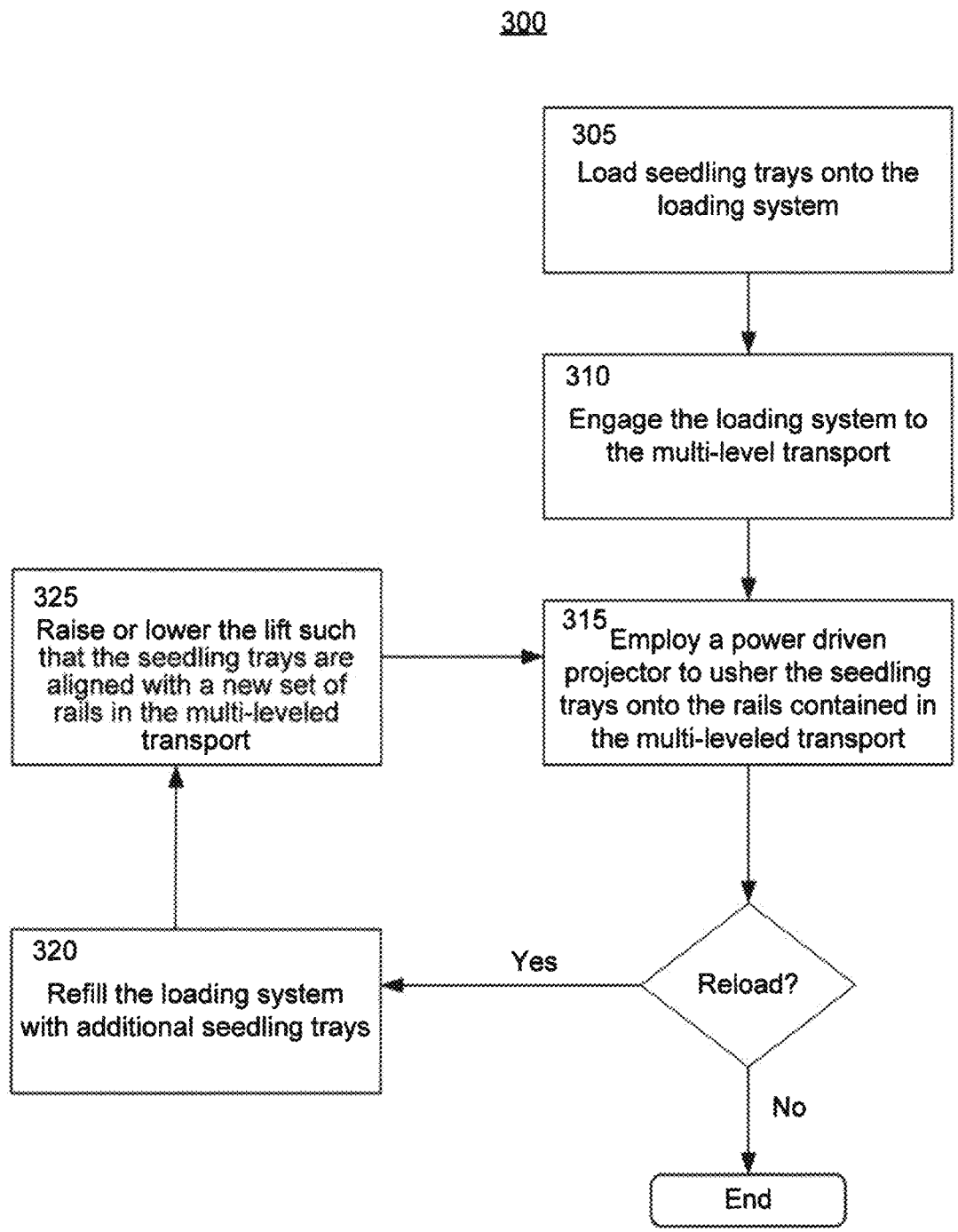
FIG. 14 is a flow chart illustrating a method of engaging the loading system to load a covered multi-level transport according to the present invention.

FIG. 14 shows a flow diagram outlining a method 300 for practicing the present loading system to load seedling flats into a covered multi-level transporter. The method 300 comprises loading 305 at least one seedling flats onto a lift of an automated loading system. The user then positions 310 the automated loading system to a covered multi-level transport, the step of engaging comprising aligning the automated loading system to the multi-level transport such that the at least one seedling flat may be urged onto a pair of opposing rails in the multi-level transport. The user may then employ 315 a power-driven projector of the automated loading system, urging the at least one seedling flat to the pair of opposing rails in the multi-level transport. The user can then reload 320 seedling flats into the lift, raise or lower 325 the automated lift to engage a new set of rails, and repeat the process as necessary to fill each additional set of rails for the desired bin. Additionally, the step of engaging may comprise securing the automated loading system to the desired bin to restrict movement of the loading system relative to the bin.

In an additional embodiment, the method 300 comprises loading 305 at least one seedling flat onto a carrier, seated on a loading platform of an automated loading system. The user then positions 310 the automated loading system to a covered multi-level transport, the step of engaging comprising aligning the automated loading system to the multi-level transport such that the carrier may be urged onto a pair of opposing rails in the multi-level transport. The user may then employ 315 a power-driven projector of the automated loading system, urging the carrier to the pair of opposing rails in the multi-level transport. The user can then reload 320 seedling flats onto the carrier on the lift, or alternately reload the loading platform with a new carrier. The user may then, raise or lower 325 the automated lift to engage a new set of rails, and repeat the process as necessary to fill each additional set of rails for the desired bin. Additionally, the step of engaging may comprise securing the automated loading system to the desired bin to restrict movement of the loading system relative to the bin. Alternatively, the user may forego the use of a carrier or a seedling flat entirely and load general cargo into a receiving unit, as described in the above method.

It should be understood that the foregoing relates to various embodiments and uses of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. An independently automated loading apparatus for unitized loading of carriers, the apparatus comprising:
   a receiving unit comprising at least one pair of rails mounted to the inside of the receiving unit, and structured to receive at least one carrier;
   a loading platform, comprising at least one transfer sled, upon which at least one carrier to be loaded into the receiving unit sits, and wherein at least one seedling flat is mounted upon each of the at least one carrier;
   a lift, coupled to the loading platform, and structured to adjust the height of the loading platform so that the at least one carrier may be urged onto the at least one pair of rails of the receiving unit; and
   at least one power driven projection block slidably mounted on the loading platform, the at least one power driven projection block positioned to urge the at least one transfer sled and the at least one carrier into the receiving unit, the at least one power driven projection block configured to engage outmost edges of the at least one carrier.

2. The independently automated loading system of claim 1, wherein the carrier is sized such that the length of the carrier is less than the depth of the receiving unit such that multiple carriers may be urged into a preselected pair of rails in sequence.

3. The independently automated loading system of claim 1, further comprising a mechanically referenced couple for securing the lift to the receiving unit.

4. The independently automated loading system of claim 1, wherein the receiving unit is a multi-level bin.

5. The independently automated loading system of claim 1, further comprising a programmable control system coupled to the lift and the at least one power driven projection block, the programmable control system having a processor and non-transitory computer readable media, the non-transitory computer readable media being communicatively coupled to the processor, wherein the non-transitory computer readable media comprising programmable instructions that when executed by the processor performs operations comprised to:
   receive an alert to raise the lift such that the at least one carrier is aligned with a selected pair of opposing rails disposed in the receiving unit;
   receive an alert to slide the at least one power driven projection block in a forward direction to usher the at least one carrier onto the selected opposing rails, wherein the at least one power driven projection block is configured to be continuously disposed above the at least one transfer sled;
   receive an alert to slide the loading platform in a reverse direction to allow the loading platform to slide out of the receiving unit, thereby enabling the lift to lower the loading platform to allow a user to refill the at least one carrier with a new load; and
   receive an alert to load a predetermined number of carriers on the rails of the receiving unit, wherein the receiving unit is a multi-level bin.

6. An independently automated loading apparatus for unitized loading of seedling flats, the apparatus comprising:
   a receiving unit, configured to receive one or more seedling flats, wherein the receiving unit comprises at least two loading columns, each loading column comprising two vertical supports, and at least one pair of rails, each pair of rails being opposably aligned and mounted to the interior of each of the vertical supports, said pair of rails being structured to accept at least one seedling flat;
   a loading platform, comprising at least one transfer sled structured to hold at least one flat to be loaded into the receiving unit;
   a lift, coupled to the loading platform, and structured to adjust the height of the loading platform so that the at least one seedling flat may be urged into the receiving unit; and
   at least one power driven projection block slidably mounted on the loading platform, the at least one power driven projection block positioned to urge the at least one transfer sled holding the at least one seedling flat into the receiving unit, the at least one power driven projection block configured to engage outmost edges of the loading platform, and wherein the at least one power driven projection block is also configured to be continuously disposed above the at least one transfer sled.

7. The independently automated loading system of claim 6, wherein the seedling tray is sized such that the length of the seedling tray is less than the depth of the receiving unit such that multiple seedling trays may be urged into a preselected pair of rails in sequence.

8. The independently automated loading system of claim 6, wherein multiple flats are arranged in columns aligned to and corresponding with the at least two loading columns in the receiving unit.

9. The independently automated loading system of claim 6, further comprising a mechanically referenced couple for securing the lift to the receiving unit.

10. The independently automated loading system of claim 6, wherein the receiving unit is a multi-level bin.

11. The independently automated loading system of claim 7, further comprising a programmable control system communicatively coupled to the lift and the at least one power driven projection block, the programmable control system having a processor and non-transitory computer readable media, the non-transitory computer readable media being communicatively coupled to the processor, wherein the non-transitory computer readable media comprising programmable instructions that when executed by the processor performs operations comprised to:
  receive an alert to raise the lift such that the at least one seedling flat is aligned with one selected pair of opposing rails disposed in the receiving unit;
  receive an alert to slide the at least one power driven projector block in a forward direction to usher the at least one seedling flat onto the selected opposing rails; and
  receive an alert to slide the loading platform in a reverse direction to allow the loading platform to slide out of the receiving unit, thereby enabling the lift to lower the loading platform to allow a user to refill the loading platform with a new load.

12. An independently automated loading apparatus for loading cargo, the apparatus comprising:
  a receiving unit, structured to receive cargo;
  a loading platform, structured to hold the cargo to be loaded into the receiving unit, the loading platform comprised of at least one transfer sled and a carrier upon which the cargo sits;
  a lift, coupled to the loading platform, and structured to adjust the height of the loading platform so that the cargo may be urged into the receiving unit; and
  at least one power driven projection block slidably mounted on the loading platform, the at least one power driven projection block positioned to urge the at least one transfer sled and the cargo into the receiving unit, the at least one power driven projection block configured to engage outmost edges of the carrier; and wherein the at least one power driven projection block is also configured to be continuously disposed above the at least one transfer sled.

13. The independently automated loading system of claim 12, further comprising a mechanically referenced couple for securing the lift to the receiving unit.

14. The independently automated loading system of claim 12, further comprising a programmable control system communicatively coupled to the lift and the at least one power driven projection block, the programmable control system having a processor and non-transitory computer readable media, the non-transitory computer readable media being communicatively coupled to the processor, wherein the non-transitory computer readable media comprising programmable instructions that when executed by the processor performs operations comprised to:
  receive an alert to raise the lift such that the carrier is positioned to be loaded into the receiving unit;
  receive an alert to slide the at least one power driven projector in a forward direction to usher the carrier into the receiving unit; and
  receive an alert to slide the loading platform in a reverse direction to allow the loading platform to slide out of the receiving unit, thereby enabling the lift to lower the loading platform to allow a user to refill the carrier with new cargo.

15. The independently automated loading system of claim 14, wherein the lift is a scissor lift.

* * * * *